(12) United States Patent
Sawada

(10) Patent No.: US 11,005,505 B2
(45) Date of Patent: May 11, 2021

(54) RADIO-FREQUENCY MODULE

(71) Applicant: Murata Manufacturing Co., Ltd., Kyoto (JP)

(72) Inventor: Yoichi Sawada, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 50 days.

(21) Appl. No.: 16/579,928

(22) Filed: Sep. 24, 2019

(65) Prior Publication Data

US 2020/0021318 A1 Jan. 16, 2020

Related U.S. Application Data

(63) Continuation of application No. PCT/JP2018/011016, filed on Mar. 20, 2018.

(30) Foreign Application Priority Data

Mar. 30, 2017 (JP) .............................. JP2017-067490

(51) Int. Cl.
    *H04B 7/005* (2006.01)
    *H04B 1/00* (2006.01)
    *H04L 5/14* (2006.01)

(52) U.S. Cl.
    CPC ........... *H04B 1/006* (2013.01); *H04B 1/0057* (2013.01); *H04L 5/14* (2013.01)

(58) Field of Classification Search
    None
    See application file for complete search history.

(56) References Cited

U.S. PATENT DOCUMENTS

| | | | |
|---|---|---|---|
| 2013/0285873 A1 | 10/2013 | Dupuy et al. | |
| 2014/0295775 A1* | 10/2014 | Rousu | H04L 5/001 455/73 |
| 2015/0028963 A1 | 1/2015 | Ebihara et al. | |

(Continued)

FOREIGN PATENT DOCUMENTS

| | | |
|---|---|---|
| JP | 2015-029233 A | 2/2015 |
| JP | 2017-038352 A | 2/2017 |

OTHER PUBLICATIONS

International Search Report for International Application No. PCT/JP2018/011016 dated Jun. 12, 2018.

(Continued)

*Primary Examiner* — Phirin Sam
(74) *Attorney, Agent, or Firm* — Pearne & Gordon LLP

(57) ABSTRACT

There is provided a radio-frequency module that can reduce communication signal loss in both the case of employing one communication band of multiple communication bands and the case of employing two or more communication bands together. A radio-frequency module includes a first switching circuit and matching circuits. The matching circuits are provided individually for a first transmission path, a second transmission path, and a third transmission path. When communications are performed by using only a first communication band, the first switching circuit selects the first transmission path. When communications are performed by using together the first communication band and the second communication band, the first switching circuit selects the second transmission path and the third transmission path.

14 Claims, 14 Drawing Sheets

(56) References Cited

U.S. PATENT DOCUMENTS

| | | | |
|---|---|---|---|
| 2016/0079946 A1* | 3/2016 | Rajendran | H03F 1/223 |
| | | | 455/127.3 |
| 2017/0048859 A1 | 2/2017 | Hayakawa | |
| 2019/0181906 A1* | 6/2019 | Liu | H04B 1/48 |

OTHER PUBLICATIONS

Written Opinion for International Application No. PCT/JP2018/011016 dated Jun. 12, 2018.

* cited by examiner

RADIO-FREQUENCY MODULE

This is a continuation of International Application No. PCT/JP2018/011016 filed on Mar. 20, 2018 which claims priority from Japanese Patent Application No. 2017-067490 filed on Mar. 30, 2017. The contents of these applications are incorporated herein by reference in their entireties.

BACKGROUND

Technical Field

The present disclosure relates to a radio-frequency module.

In recent years, in the field of wireless communications, a technology for employing a combination of multiple communication bands of frequency ranges different from each other has been widely used. This technology is called CA (Carrier Aggregation) and the purpose of the technology is to achieve high-speed and stable communications (improvement of communication quality and reliability) by employing multiple communication bands together. In the communications using CA, it is necessary to decrease attenuation of communication signals by optimizing the impedance (impedance matching) of a communication circuit side when viewed from an antenna side in the case of employing multiple communication bands together.

For example, an electronic circuit according to Patent Document 1 includes a switch, a first duplexer, a second duplexer, and a receive filter. The switch includes multiple ports and selects from the multiple ports a port to be connected to an antenna. The first duplexer is coupled between a first port of the multiple ports and a first terminal and has a first pass band. The second duplexer is coupled between a second port of the multiple ports and a second terminal and has a second pass band whose interval between the receive band and the transmission band is narrower than that of the first pass band. The receive filter is coupled between a third port of the multiple ports and a third terminal and has a receive band covering the receive band of the second pass band. When transmission and reception of signals involved in the first pass band and reception of signals involved in the second pass band are performed at the same time, the switch selects the first and third ports and does not select the second port.

Specifically, when the switch selects the first and third ports, in relation to the frequencies included in the transmission and receive bands of the first pass band, the filter is disconnected as viewed from the switch, while the first duplexer is disconnected as viewed from the switch in relation to the frequencies included in the receive band of the second pass band. As a result, in the communications using CA, leakage of communication signals is reduced, and therefore, communication signal loss is reduced.

Patent Document 1: Japanese Unexamined Patent Application Publication No. 2015-29233

BRIEF SUMMARY

In the communications using CA, for the purpose of reducing the influence due to different communication bands, a matching circuit is provided between a duplexer and an antenna. In the matching circuit, the optimum value of impedance varies between the case of employing a single communication band and the case of employing multiple communication bands, and as a result, there is a problem in which, when the impedance is optimized for one case, the characteristics are degraded in the other case.

The present disclosure provides a radio-frequency module that can reduce communication signal loss in both the case of employing one communication band of multiple communication bands and the case of employing two or more communication bands together.

A radio-frequency module according to one aspect of the present disclosure includes a first transmission path, a second transmission path, a third transmission path, an antenna terminal, matching circuits, and a switching circuit. The first transmission path responds to a first communication band. The third transmission path respond to a second communication band of a frequency range different from another frequency range of the first communication band. The antenna terminal is electrically coupled to an antenna. The matching circuits are provided individually for the first transmission path, the second transmission path, and the third transmission path. The switching circuit has a common terminal with respect to which electrical connection of one or more of the first transmission path, the second transmission path, and the third transmission path is selectively established. The common terminal is electrically coupled to the antenna terminal. When communications are performed by using only the first communication band, the switching circuit selects the first transmission path. When communications are performed by using together the first communication band and the second communication band, the switching circuit selects the second transmission path and the third transmission path.

The radio-frequency module according to the above aspect of the present disclosure can reduce communication signal loss in both the case of employing one communication band of multiple communication bands and the case of employing two or more communication bands together.

DETAILED DESCRIPTION

An embodiment described below relates to a radio-frequency module. More specifically, the embodiment described below relates to a radio-frequency module that can employ together two or more communication bands of frequency ranges different from each other.

The embodiment of the present disclosure is described below with reference to the drawings.

Figure 1:
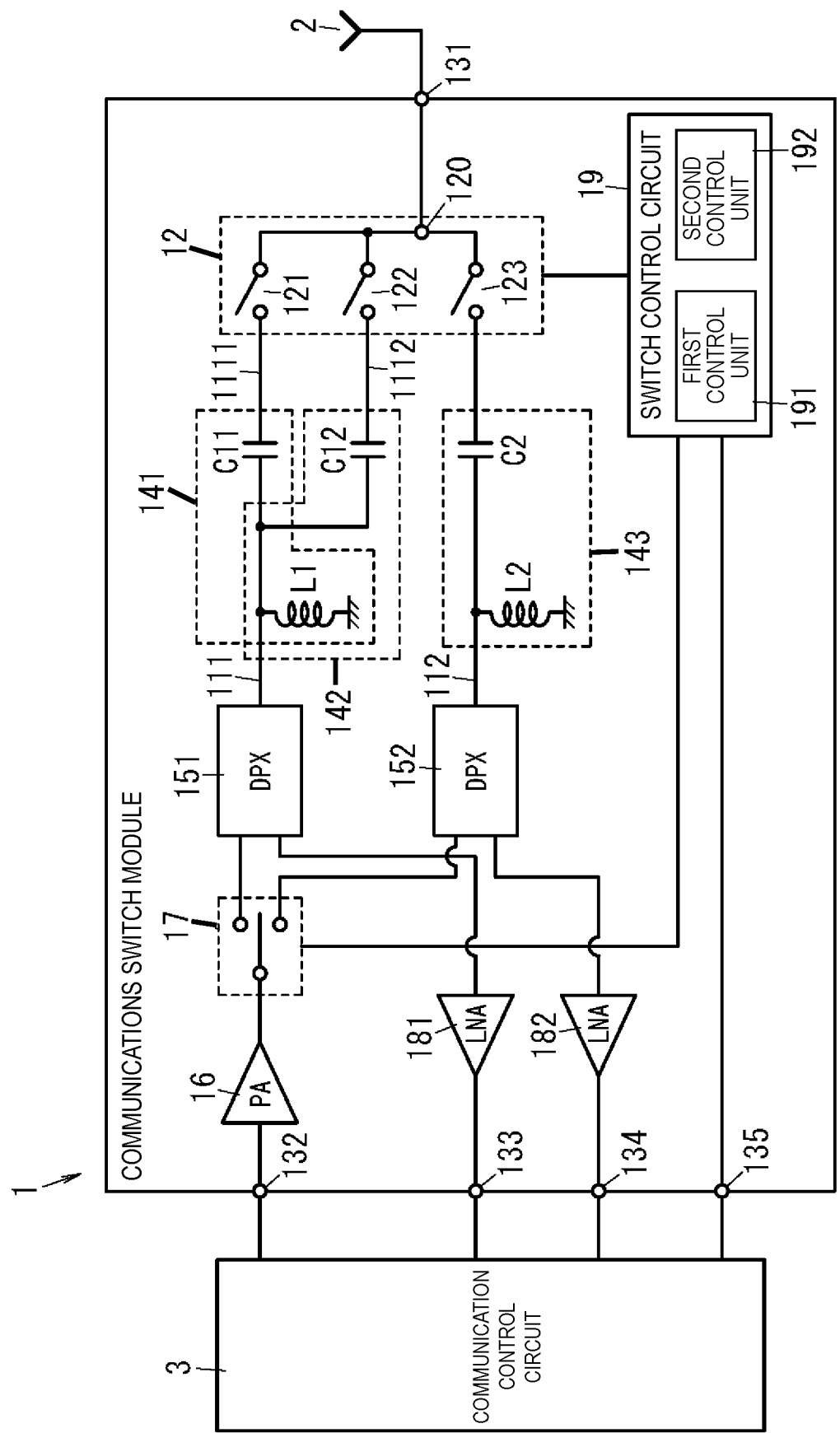
FIG. 1 is a block diagram illustrating a radio-frequency module according to an embodiment of the present disclosure.

FIG. 1 illustrates a circuit configuration of a radio-frequency module 1 according to the embodiment.

The radio-frequency module 1 includes, as a main configuration, two transmission paths 111 and 112, a first switching circuit 12, an antenna terminal 131, and three matching circuits 141 to 143. The radio-frequency module 1 also can include duplexers 151 and 152. The radio-frequency module 1 also includes a power amplifier 16 and a second switching circuit 17. The radio-frequency module 1 also includes low noise amplifiers 181 and 182. The radio-frequency module 1 also includes a switch control circuit 19. Additionally, the radio-frequency module 1 also includes an input terminal 132, output terminals 133 and 134, and a control terminal 135.

The transmission paths 111 and 112 are formed of a conductor that is used for transmitting electrical signals. The transmission paths 111 and 112 are formed of, for example, silver or copper. The transmission path 111 branches into two transmission paths 1111 and 1112. Hereinafter, the transmission path 1111 is referred to as a first transmission path 1111, the transmission path 1112 is referred to as a second transmission path 1112, and the transmission path 112 is referred to as a third transmission path 112.

Both the first transmission path 1111 and the second transmission path 1112 respond to a first communication band while the third transmission path 112 responds to a second communication band. The frequency range of the first communication band and the frequency range of the second communication band differ from each other. Electrical signals transmitted through the first transmission path 1111 or the second transmission path 1112 are communication signals of the first communication band. Electrical signals transmitted through the third transmission path 112 are communication signals of the second communication band. It should be noted that communication signals include transmit signals and receive signals.

The first switching circuit 12 is a semiconductor switching circuit. The first switching circuit 12 includes switches 121 to 123. The switches 121 to 123 are each configured as, for example, a field effect transistor (FET), a MEMS (Micro Electro Mechanical Systems) switch, or a bipolar transistor. One end of each of the switches 121 to 123 is electrically coupled to a common terminal 120. The common terminal 120 is electrically coupled also to the antenna terminal 131. The other ends of the switches 121 to 123 are electrically coupled respectively to the first transmission path 1111, the second transmission path 1112, and the third transmission path 112. In the first switching circuit 12, by switching on or off the respective switches 121 to 123, the electrical connection between each of the first transmission path 1111, the second transmission path 1112, and the third transmission path 112, and the antenna terminal 131 can be changed between a connected state and a disconnected state.

An antenna 2 is electrically coupled to the antenna terminal 131. The antenna 2 is used for communications in which radio waves are transmitted and received.

The matching circuits 141 to 143 are provided for adjusting the impedance of the transmission path side when viewed from the antenna terminal 131 and each constituted by a wiring and impedance elements such as a capacitor and an inductor.

The matching circuit 141 is provided in relation to the first transmission path 1111 and constituted by an inductor L1 and a capacitor C11. The inductor L1 is electrically coupled in a shunt manner across the transmission path 111 and ground. The capacitor C11 is electrically coupled in series with the first transmission path 1111. The matching circuit 142 is provided in relation to the second transmission path 1112 and constituted by the inductor L1 and a capacitor C12. The capacitor C12 is electrically coupled in series with the second transmission path 1112.

While the matching circuits 141 and 142 shares the inductor L1, the matching circuits 141 and 142 may be both constituted by only impedance elements not shared by the matching circuits 141 and 142. In FIG. 1, the matching circuits 141 and 142 use the inductor L1 as a common impedance element, and as a result, the number of necessary impedance elements is decreased.

The matching circuit 143 is provided in relation to the third transmission path 112 and constituted by an inductor L2 and a capacitor C2. The inductor L2 is electrically coupled in a shunt manner across the third transmission path 112 and ground. The capacitor C2 is electrically coupled in series with the third transmission path 112.

Electrical communication between the first transmission path 1111 and the antenna terminal 131 is established via the switch 121 in an ON state. Electrical communication between the second transmission path 1112 and the antenna terminal 131 is established via the switch 122 in an ON state. Electrical communication between the third transmission path 112 and the antenna terminal 131 is established via the switch 123 in an ON state.

The duplexers 151 and 152 both have a function of filtering communication signals (transmit signals) at transmit frequencies and communication signals (receive signals) at receive frequencies and both includes a transmit-side filter and a receive-side filter. To be specific, the duplexer 151 corresponds to a first filter circuit and the duplexer 152 corresponds to a second filter circuit.

The transmit-side filter of the duplexer 151 passes transmit signals at the transmit frequencies of the first communication band and attenuates signals at frequencies other than the transmit frequencies. The receive-side filter of the duplexer 151 passes receive signals at the receive frequencies of the first communication band and attenuates signals at frequencies other than the receive frequencies.

The transmit-side filter of the duplexer 152 passes transmit signals at the transmit frequencies of the second communication band and attenuates signals at frequencies other than the transmit frequencies. The receive-side filter of the duplexer 152 passes receive signals at the receive frequencies of the second communication band and attenuates signals at frequencies other than the receive frequencies.

The power amplifier 16 is a multi-band power amplifier and the input end of the power amplifier 16 is electrically coupled to a communication control circuit 3 via the input terminal 132. The power amplifier 16 amplifies transmit signals of the first and second communication bands that are input from the communication control circuit 3 and outputs the amplified transmit signals from the output end thereof. It should be noted that the power amplifier 16 corresponds to a transmission amplifier circuit.

The second switching circuit 17 is a semiconductor switching circuit positioned between the output end of the power amplifier 16 and the duplexers 151 and 152. The second switching circuit 17 can establish connection of the output of the power amplifier 16 selectively to the transmit-side filter of the duplexer 151 or the transmit-side filter of the duplexer 152. The second switching circuit 17 can also disconnect the output of the power amplifier 16 from both the duplexers 151 and 152.

The low noise amplifier 181 is electrically coupled to the receive-side filter of the duplexer 151. The low noise amplifier 181 amplifies receive signals of the first communication band that are output from the receive-side filter of the duplexer 151. The low noise amplifier 181 outputs the amplified receive signals to the communication control circuit 3 via the output terminal 133. It should be noted that the low noise amplifier 181 corresponds to a reception amplifier circuit.

The low noise amplifier 182 is electrically coupled to the receive-side filter of the duplexer 152. The low noise amplifier 182 amplifies receive signals of the second communication band that are output from the receive-side filter of the duplexer 152. The low noise amplifier 182 outputs the amplified receive signals from the output end thereof to the communication control circuit 3 via the output terminal 134. It should be noted that the low noise amplifier 182 corresponds to a reception amplifier circuit.

The switch control circuit 19 includes a first control unit 191 and a second control unit 192. The switch control circuit 19 receives a control signal from the communication control circuit 3 via the control terminal 135 and controls separately the first switching circuit 12 and the second switching circuit 17 in accordance with the control signal. The first control unit 191 performs ON or OFF control individually for the switches 121 to 123 of the first switching circuit 12. The second control unit 192 controls the second switching circuit 17 and changes the connection destination of the output end of the power amplifier 16.

The radio-frequency module 1 includes the power amplifier 16, and the low noise amplifiers 181 and 182 as described above, which collectively form a front-end circuit for wireless communications.

The communication control circuit 3 involves a computer. The computer includes, as main components, a device having a processor that runs a program, an interface device that transmits and receives signals to and from another apparatus, and a storage device that stores the program and data. The device having a processor may be any of a CPU (Central Processing Unit) and an MPU (Micro Processing Unit) provided separately from the storage device, and a microcomputer in which the storage device is incorporated.

As the storage device, a storage device whose access time is relatively short, such as a semiconductor memory, is usually used.

The program is provided by, for example, being stored in advance in a storage medium, such as a computer-readable ROM (Read Only Memory) or a computer-readable optical disk or being supplied to a storage medium via a wide area communication network, such as the Internet.

In the communication control circuit 3, the computer runs the program to perform modulation processing for transmit signals, demodulation processing for receive signals, and switch processing for the first switching circuit 12 and the second switching circuit 17. It should be noted that the communication control circuit 3 may be configured by assembling discrete components.

Hereinafter, the operation of the radio-frequency module 1 is described based on the assumption that the first communication band is the 900 MHz band and the second communication band is the 800 MHz band. As an example, the capacitance of the capacitor C11 is 20 pF, the capacitance of the capacitor C12 is 7 pF, and the capacitance of the capacitor C2 is 22 pF. The inductance of the inductor L1 is 8.2 nH and the inductance of the inductor L2 is 7.5 nH.

It should be noted that communication bands are defined in the 3GPP (Third Generation Partnership Project) technology specifications: TS36.101. When the first communication band is Band 8 of the 900 MHz band, the transmit frequencies range from 880 to 915 MHz and the receive frequencies range from 925 to 960 MHz. When the second communication band is Band 20 of the 800 MHz band, the transmit frequencies range from 832 to 862 MHz and the receive frequencies range from 791 to 821 MHz. The communication bands described above as communication bands targeted by the radio-frequency module 1 are mere examples and communication bands targeted by the radio-frequency module 1 are not limited to specific communication bands.

In the following description, of the first communication band and the second communication band, a communication band used for communications is referred to as an active band.

Firstly, when a control signal transmitted from the communication control circuit 3 indicates an instruction for using, as the communication mode, a single mode in which only the first communication band (the 900 MHz band) is the active band, the radio-frequency module 1 accordingly operates as follows. It should be noted that, in the following description, the single mode in which the first communication band is an active band is referred to as a first single mode.

The first control unit 191 performs ON control for the switch 121 and OFF control individually for the switches 122 and 123. As a result, the electrical connection between the first transmission path 1111 and the antenna terminal 131 is in a connected state, while the electrical connection between the second transmission path 1112 and the antenna terminal 131 and the electrical connection between the third transmission path 112 and the antenna terminal 131 are both in a disconnected state.

The second control unit 192 is notified of when to transmit transmit signals of the first communication band by a control signal transmitted from the communication control circuit 3. When a transmit signal of the first communication band is present, the second control unit 192 controls the second switching circuit 17 to electrically couple the output end of the power amplifier 16 to the duplexer 151.

As a result, transmit signals of the first communication band that are output from the transmit-side filter of the duplexer 151 and receive signals of the first communication band that are to be input to the receive-side filter of the duplexer 151 are transmitted through the transmission path 111.

At this time, since only the first transmission path 1111 is in electrical communication with the antenna terminal 131, only the matching circuit 141 of the matching circuits 141 to 143 is in electrical communication with the antenna terminal 131. The matching circuit 141 is used for impedance matching with respect to the transmission path 111 side during communications in the first single mode. Specifically, impedance matching is achieved by the matching circuit 141 to cause the impedance of the transmission path 111 side and the impedance of the antenna side to become close to each other (ideally identical to each other) in the frequency range of the first communication band. It should be noted that the impedance of the transmission path 111 side is the impedance when the transmission path 111 side is viewed from the antenna terminal 131 in relation to a switch or switches in an ON state (the switch 121, the switch 122, or the switches 121 and 122) and the first transmission path 1111. The impedance of the transmission path 111 side is determined, in the first single mode, depending on the matching circuit 141, the transmit-side and receive-side filters of the duplexer 151, the power amplifier 16, the low noise amplifier 181, and wirings coupling these components to each other and the like. The impedance of the antenna side is the impedance when the antenna 2 side is viewed from the antenna terminal 131.

Figure 2:
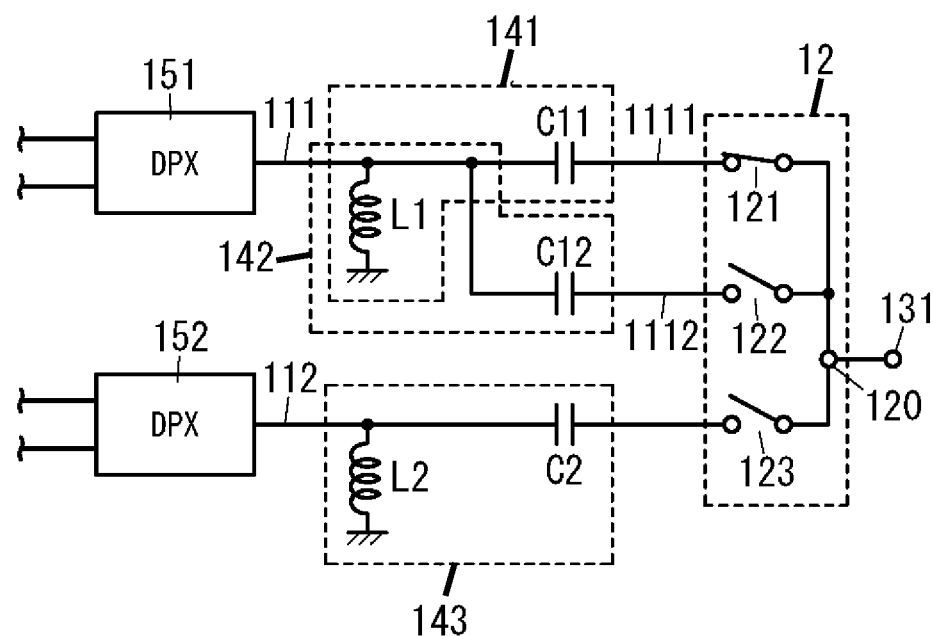
FIG. 2 is a simplified circuit diagram illustrating a state of a switching circuit in a first single mode of the radio-frequency module.

FIG. 2 illustrates a state of the first switching circuit 12 in the first single mode. The impedance of the transmission path 111 side in this state, in the receive frequency range of 925 to 960 MHz of the first communication band, is represented by a locus X1 in a Smith chart in FIG. 3A. The locus X1 exists at an area relatively close to an antenna side impedance Z1. As a result, as indicated by a characteristic Y1 in FIG. 3B, insertion loss is relatively small and constant in the frequency range of 925 to 960 MHz, and thus, frequency characteristics of receive signals of the first communication band that are input to the antenna terminal 131 are favorable. It should be noted that the antenna side impedance Z1 is set at, for example, 50Ω, but not limited to a specific value.

Figure 3A:
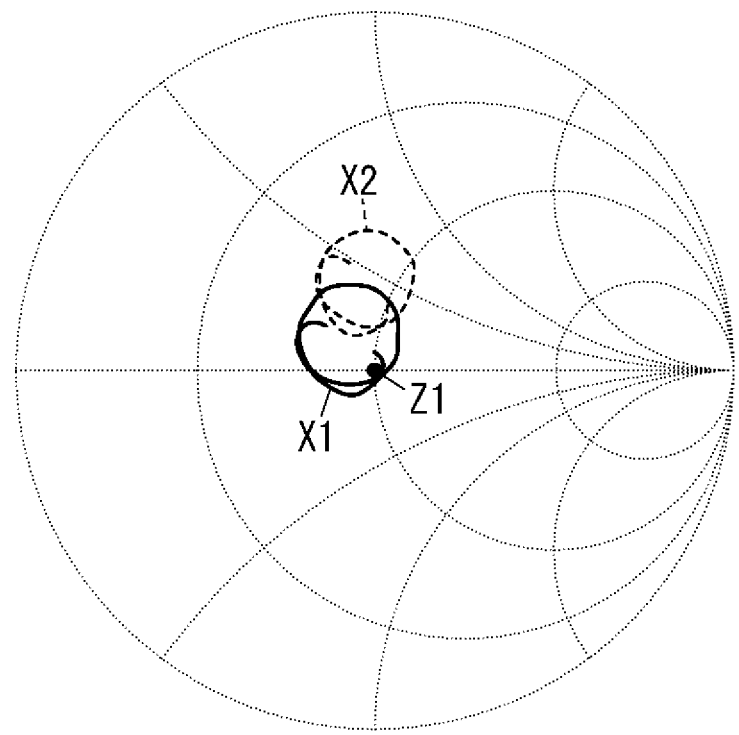
FIG. 3A is a Smith chart illustrating the impedance of a transmission path side in the first single mode of the radio-frequency module.

In contrast, a locus X2 in the Smith chart in FIG. 3A is a comparative example. The locus X2 represents the impedance of the transmission path 111 side at the receive frequencies of the first communication band when only the matching circuit 142 instead of the matching circuit 141 is in electrical communication with the antenna terminal 131 in the first single mode. The locus X2 exists at an area away from the antenna side impedance Z1, compared to the locus X1. As a result, concerning the frequency characteristics of receive signals of the first communication band that are input to the antenna terminal 131, as indicated by a characteristic Y2 in FIG. 3B, insertion loss is relatively large locally in the frequency range of 930 to 950 MHz. In conclusion, the frequency characteristics of receive signals are less favorable with respect to the characteristic Y2 compared to the characteristic Y1.

Figure 3B:
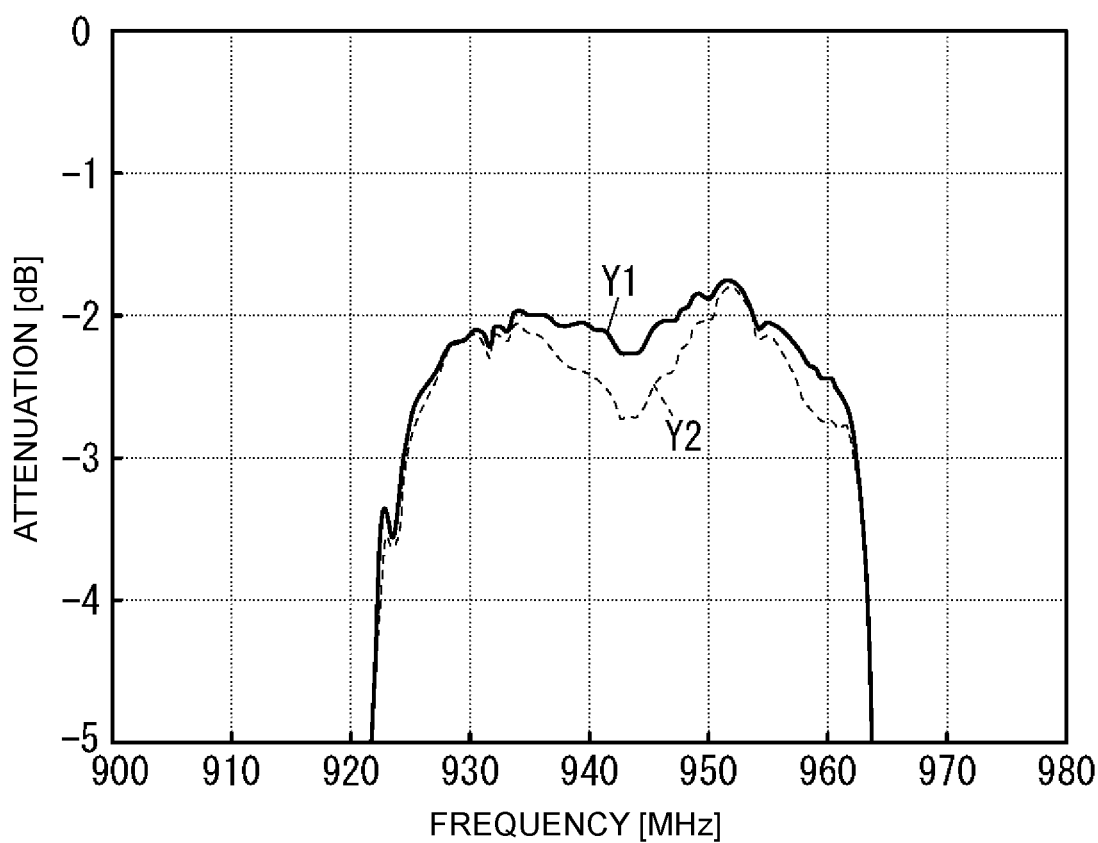
FIG. 3B is a diagram of frequency characteristics of receive signals in the first single mode of the radio-frequency module.

It should be noted that FIGS. 3A and 3B represent an impedance characteristic and a frequency characteristic of the receive frequencies of the first communication band. However, in the first single mode, electrical communication only between the matching circuit 141 and the antenna terminal 131 is established (see FIG. 2), and as a result, favorable frequency characteristics can be achieved also with regard to transmit signals of the first communication band in a similar manner.

Therefore, in the first single mode, by causing only the matching circuit 141 to establish electrical communication with the antenna terminal 131, favorable frequency characteristics can be achieved with regard to communication signals of the first communication band.

Next, when a control signal transmitted from the communication control circuit 3 indicates an instruction for using, as the communication mode, a single mode in which only the second communication band (the 800 MHz band) is an active band, the radio-frequency module 1 accordingly operates as follows. It should be noted that, in the following description, the single mode in which the second communication band is an active band is referred to as a second single mode.

The first control unit 191 performs ON control for the switch 123 and OFF control individually for the switches 121 and 122. As a result, the electrical connection between the third transmission path 112 and the antenna terminal 131 is in a connected state, while the electrical connection between the first transmission path 1111 and the antenna terminal 131 and the electrical connection between the second transmission path 1112 and the antenna terminal 131 are both in a disconnected state.

The second control unit 192 is notified of when to transmit a transmit signal of the second communication band by a control signal transmitted from the communication control circuit 3. When a transmit signal of the second communication band is present, the second control unit 192 controls the second switching circuit 17 to electrically couple the output end of the power amplifier 16 to the duplexer 152.

As a result, transmit signals of the second communication band that are output from the transmit-side filter of the duplexer 152 and receive signals of the second communication band that are to be input to the receive-side filter of the duplexer 152 are transmitted through the third transmission path 112.

At this time, since only the third transmission path 112 is in electrical communication with the antenna terminal 131, only the matching circuit 143 of the matching circuits 141 to 143 is in electrical communication with the antenna terminal 131. The matching circuit 143 is used for impedance matching during communications in the second single mode. Specifically, impedance matching is achieved by the matching circuit 143 to cause the impedance of the third transmission path 112 side and the impedance of the antenna side to become close to each other (ideally identical to each other) in the frequency range of the second communication band. It should be noted that the impedance of the third transmission path 112 side is the impedance when the third transmission path 112 side is viewed from the antenna terminal 131 in relation to the switch 123 in an ON state. The impedance of the third transmission path 112 side is determined, in the second single mode, depending on the matching circuit 143, the transmit-side and receive-side filters of the duplexer 152, the power amplifier 16, the low noise amplifier 182, and wirings coupling these components to each other and the like.

Figure 4:
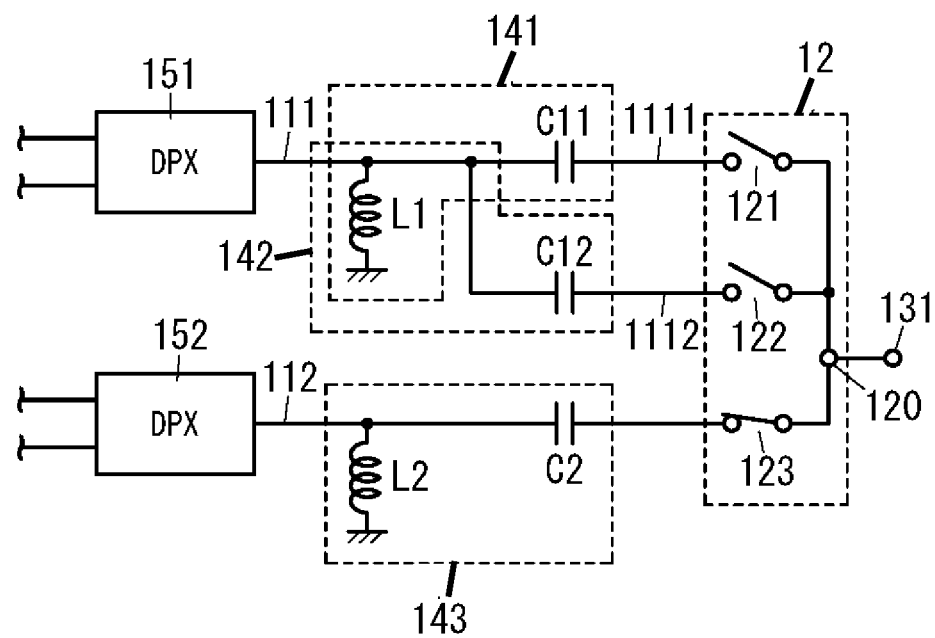
FIG. 4 is a simplified circuit diagram illustrating a state of the switching circuit in a second single mode of the radio-frequency module.

FIG. 4 illustrates a state of the first switching circuit 12 in the second single mode. In this state, impedance matching is achieved by the matching circuit 143 with respect to the impedance of the third transmission path 112 side, and thus, frequency characteristics of both receive and transmit signals of the second communication band are favorable. Therefore, in the second single mode, by causing only the matching circuit 143 to establish electrical communication with the antenna terminal 131, favorable frequency characteristics can be achieved with regard to communication signals of the second communication band.

Next, when a control signal transmitted from the communication control circuit 3 indicates an instruction for using, as the communication mode, a CA mode (Carrier Aggregation Mode) in which both the first communication band (the 900 MHz band) and the second communication band (the 800 MHz band) are employed, the radio-frequency module 1 accordingly operates as follows. In the CA mode, the first communication band and the second communication band are both active bands.

The first control unit 191 performs ON control individually for the switches 122 and 123 and OFF control for the switch 121. As a result, the electrical connection between the second transmission path 1112 and the antenna terminal 131 and the electrical connection between the third transmission path 112 and the antenna terminal 131 are in a connected state, while the electrical connection between the first transmission path 1111 and the antenna terminal 131 is in a disconnected state.

When a transmit signal of the first communication band is present, the second control unit 192 controls the second switching circuit 17 to electrically couple the output end of the power amplifier 16 to the duplexer 151. When a transmit signal of the second communication band is present, the second control unit 192 controls the second switching circuit 17 to electrically couple the output end of the power amplifier 16 to the duplexer 152.

As a result, transmit signals of the first communication band that are output from the transmit-side filter of the duplexer 151 and receive signals of the first communication band that are to be input to the receive-side filter of the duplexer 151 are transmitted through the transmission path 111. Additionally, transmit signals of the second communication band that are output from the transmit-side filter of the duplexer 152 and receive signals of the second communication band that are to be input to the receive-side filter of the duplexer 152 are transmitted through the third transmission path 112.

At this time, since only the second transmission path 1112 and the third transmission path 112 are in electrical communication with the antenna terminal 131, the matching circuits 142 and 143 of the matching circuits 141 to 143 are in electrical communication with the antenna terminal 131. The impedance of the transmission path 111 side is determined depending on not only the matching circuit 142, the transmit-side and receive-side filters of the duplexer 151, the power amplifier 16, the low noise amplifier 181, and wirings coupling these components to each other and the like but also the matching circuit 143, the transmit-side and receive-side filters of the duplexer 152, the low noise amplifier 182, and wirings coupling these components to each other and the like. To be specific, in the CA mode, the matching circuit 143 in electrical communication with the antenna terminal 131, the transmit-side and receive-side filters of the duplexer 152, the low noise amplifier 182, and the wirings coupling these components to each other and the like affect the impedance of the transmission path 111 side. In other words, the impedance of the transmission path 111 side varies depending on whether the switch 123 is ON or OFF.

Thus, the radio-frequency module 1 uses, for impedance matching with respect to the transmission path 111 side, the matching circuit 141 in the first single mode or the matching circuit 142 in the CA mode. The impedance value of the matching circuit 141 is set at a value that enables a matching of the impedance of the transmission path 111 side in the first single mode. In contrast, the impedance value of the matching circuit 142 is set at a value that enables a matching of the impedance of the transmission path 111 side in the CA mode.

As described above, the matching circuit 142 is used for impedance matching with respect to the transmission path 111 side during communications in the CA mode. Impedance matching is achieved by the matching circuit 142 to cause the impedance of the transmission path 111 side and the impedance of the antenna side to become close to each other (ideally identical to each other) in the frequency range of the first communication band.

Figure 5:
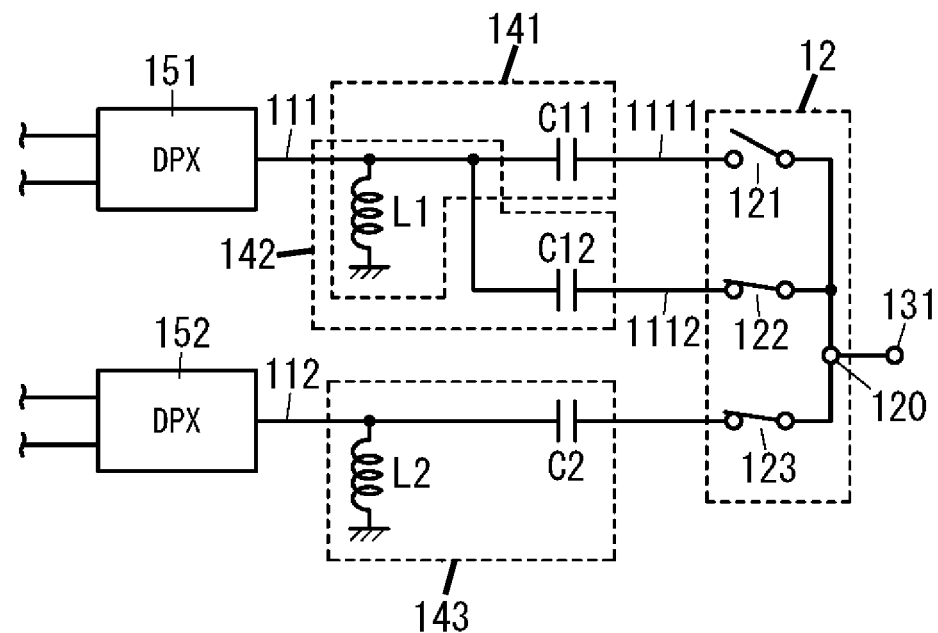
FIG. 5 is a simplified circuit diagram illustrating a state of the switching circuit in a CA mode of the radio-frequency module.

FIG. 5 illustrates a state of the first switching circuit 12 in the CA mode. The impedance of the transmission path 111 side in this state, in the receive frequency range of 925 to 960 MHz of the first communication band, is represented by a locus X3 in a Smith chart in FIG. 6A. The locus X3 exists at an area relatively close to the antenna side impedance Z1. As a result, as indicated by a characteristic Y3 in FIG. 6B, insertion loss is relatively small and constant in the frequency range of 925 to 960 MHz, and thus, frequency characteristics of receive signals of the first communication band that are input to the antenna terminal 131 are favorable.

Figure 6A:
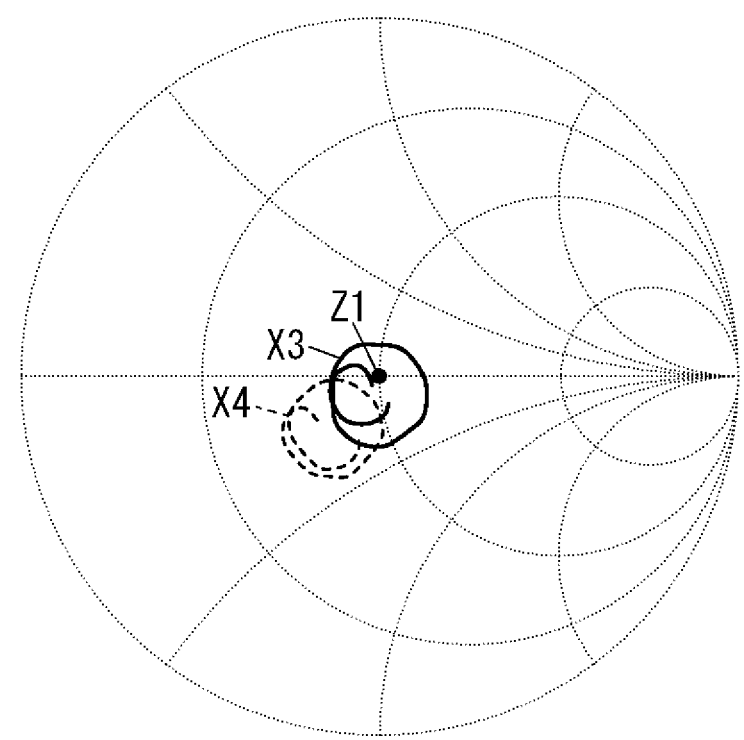
FIG. 6A is a Smith chart illustrating the impedance of the transmission path side in the CA mode of the radio-frequency module.

In contrast, a locus X4 in the Smith chart in FIG. 6A is a comparative example. The locus X4 represents the impedance of the transmission path 111 side at the receive frequencies of the first communication band when the matching circuit 141 instead of the matching circuit 142 is in electrical connection with the transmission path 111 in the CA mode. The locus X4 exists at an area away from the antenna side impedance Z1, compared to the locus X3. As a result, concerning the frequency characteristics of receive signals of the first communication band that are input to the antenna terminal 131, as indicated by a characteristic Y4 in FIG. 6B, insertion loss is relatively large on both the higher frequency side and the lower frequency side with respect to the center frequency of the receive frequencies of the first communication band. In conclusion, the frequency characteristics of receive signals are less favorable with respect to the characteristic Y4 compared to the characteristic Y3.

Figure 6B:
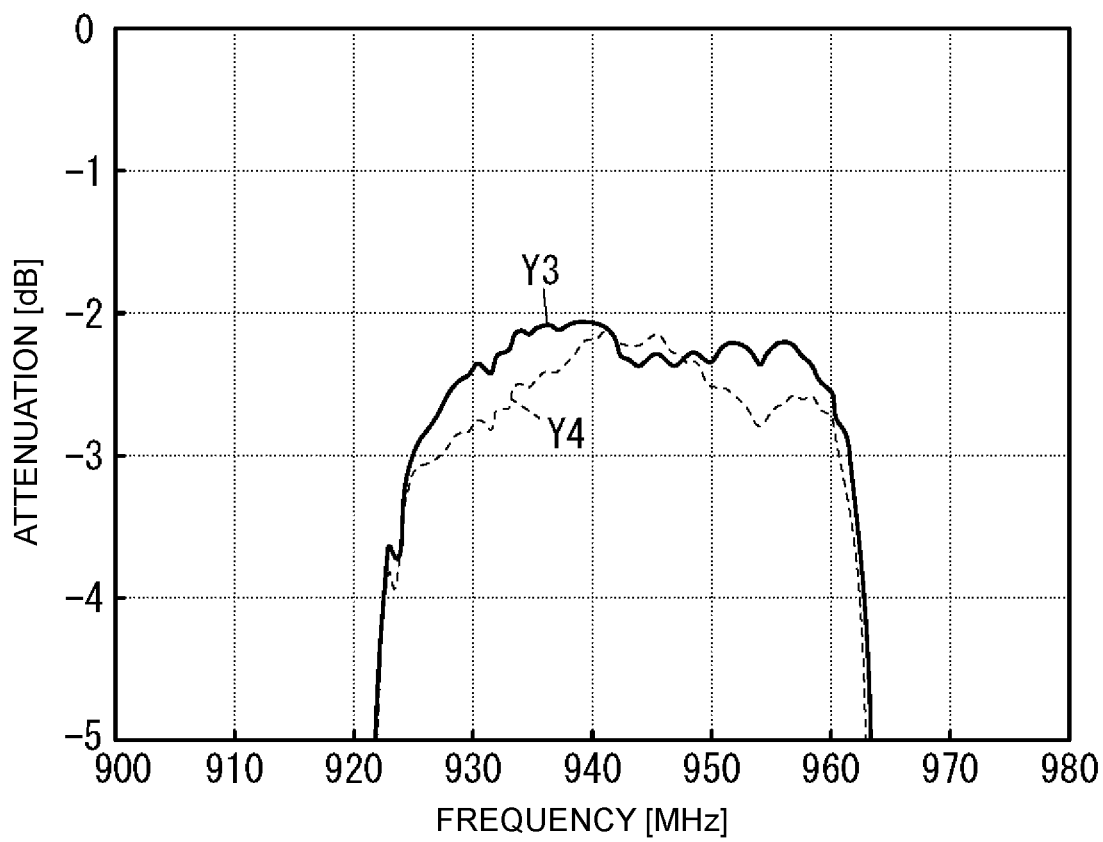
FIG. 6B is a diagram of frequency characteristics of receive signals in the CA mode of the radio-frequency module.

It should be noted that FIGS. 6A and 6B represent the impedance characteristic and the frequency characteristic of the receive frequencies of the first communication band. However, in the CA mode, electrical communication between the matching circuit 142 and the antenna terminal 131 and electrical communication between the matching circuit 143 and the antenna terminal 131 are established (see FIG. 5), and as a result, favorable frequency characteristics can be achieved also with regard to transmit signals of the first communication band in a similar manner.

Therefore, in the CA mode, by causing the matching circuits 142 and 143 to establish electrical communication with the antenna terminal 131, favorable frequency characteristics can be achieved with regard to communication signals of the first communication band.

The states of the switches 121 to 123 (ON, OFF) in the first single mode, the second single mode, and the CA mode described above are indicated in Table 1. The states of the switches 121 to 123 in the first single mode, the second single mode, and the CA mode are determined to achieve favorable impedance matching in the respective communication modes.

TABLE 1

| | Communication mode | | |
|---|---|---|---|
| | First single mode | Second single mode | CA mode |
| Switch 121 | ON | OFF | OFF |
| Switch 122 | OFF | OFF | ON |
| Switch 123 | OFF | ON | ON |

The second control unit 192 stores in advance table data of table 1 and controls the states of the switches 121 to 123 in accordance with the communication mode that is designated by an instruction. As described above, the radio-frequency module 1 can perform selection of transmission path in accordance with a communication mode (the number of active bands and the combination of active bands) and selection of matching circuit in accordance with the communication mode by only performing switching operation of the first switching circuit 12. As described above, in the radio-frequency module 1, the states of switches corresponding to all communication modes are preset in the table data described above, and therefore, the radio-frequency module 1 can perform selection of transmission path and selection of matching circuit by using a simple configuration in the case in which the number of communication modes increases as the number of communication bands increases.

The radio-frequency module 1 uses a single matching circuit, that is, the matching circuit 143, for impedance matching with respect to the third transmission path 112 side in both the second single mode and the CA mode. This is because the change in the impedance of the third transmission path 112 side due to switching of the switch 122 between ON and OFF is relatively small in the frequency range of the second communication band, and as a result, the matching circuit 143 can be used commonly in the second single mode and the CA mode. The impedance value of the matching circuit 143 is thus set at a value that enables a matching of the impedance of the third transmission path 112 side in the second single mode and the CA mode.

In FIG. 1, the connection arrangement of the impedance elements of each of the matching circuits 141 to 143 is such that a capacitor is inserted in a transmission path and an inductor is in shunt connection with respect to the transmission path, which is a high-pass type. In other words, in the matching circuits 141 to 143, the connection arrangements of the impedance elements with respect to the transmission path 111 or 112 are identical to each other. The matching circuits 141 to 143 achieve simplification of their configurations by using the identical connection arrangement (the high-pass type in this case) of the impedance elements.

While in the above description it is assumed that the first communication band is the 900 MHz band and the second communication band is the 800 MHz band, the value of the frequency range of a communication band that is employed is not limited to these values. In addition, the antenna side inductance varies depending on the type of the antenna 2 that is used. Therefore, the impedances of multiple matching circuits need to be set as appropriate in accordance with the frequency ranges of communication bands that are employed and the impedance of the antenna side.

Hereinafter, a modified example of a matching circuit is described. The radio-frequency module 1 includes matching circuits suitable for the frequency ranges of communication bands that are employed and the impedance of the antenna side.

Figure 7A:
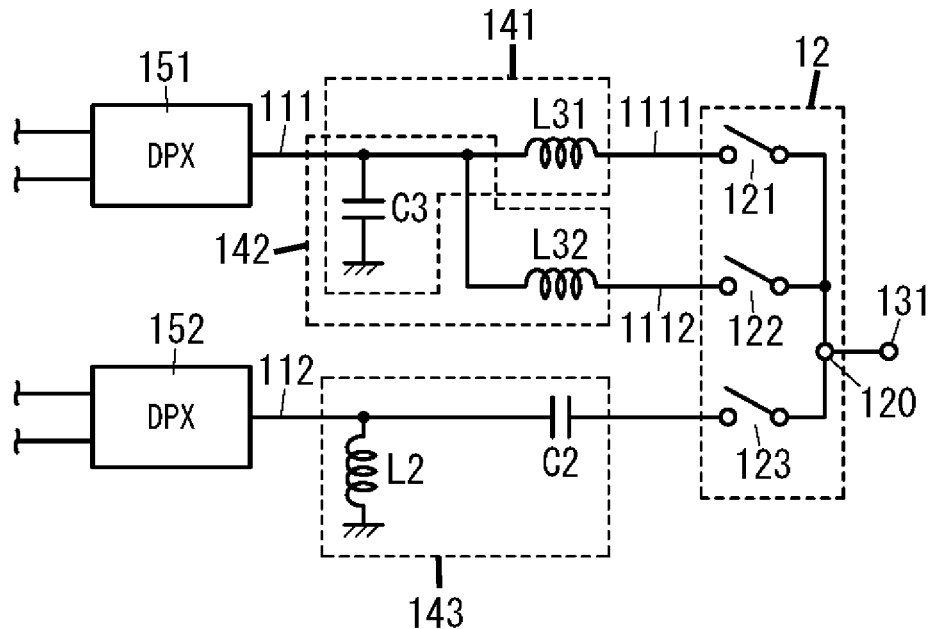
FIG. 7A is a simplified circuit diagram illustrating a first example of matching circuits of the radio-frequency module.

In FIG. 7A, the connection arrangement of the impedance elements of each of the matching circuits 141 and 142 is a low-pass type. Specifically, the matching circuit 141 is constituted by an inductor L31 and a capacitor C3. The capacitor C3 is electrically coupled in a shunt manner across the transmission path 111 and ground. The inductor L31 is electrically coupled in series with the first transmission path 1111. The matching circuit 142 is constituted by an inductor L32 and the capacitor C3. The inductor L32 is electrically coupled in series with the second transmission path 1112.

Figure 7B:
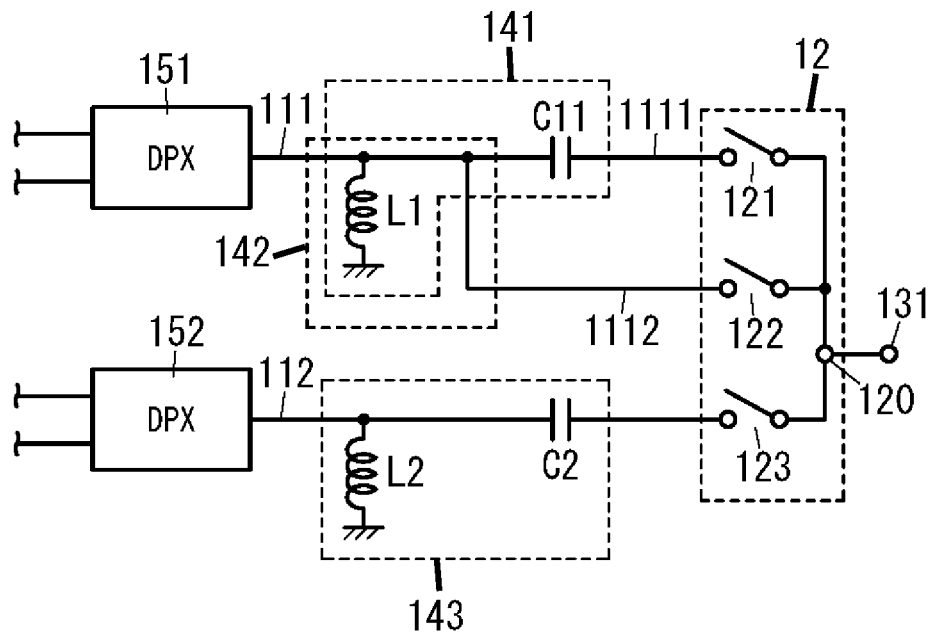
FIG. 7B is a simplified circuit diagram illustrating a second example of matching circuits of the radio-frequency module.

In FIG. 7B, the matching circuit 142 is constituted by only the inductor L1.

In addition, ON control may be performed for both the switches 121 and 122 of the first switching circuit 12.

Figure 8:
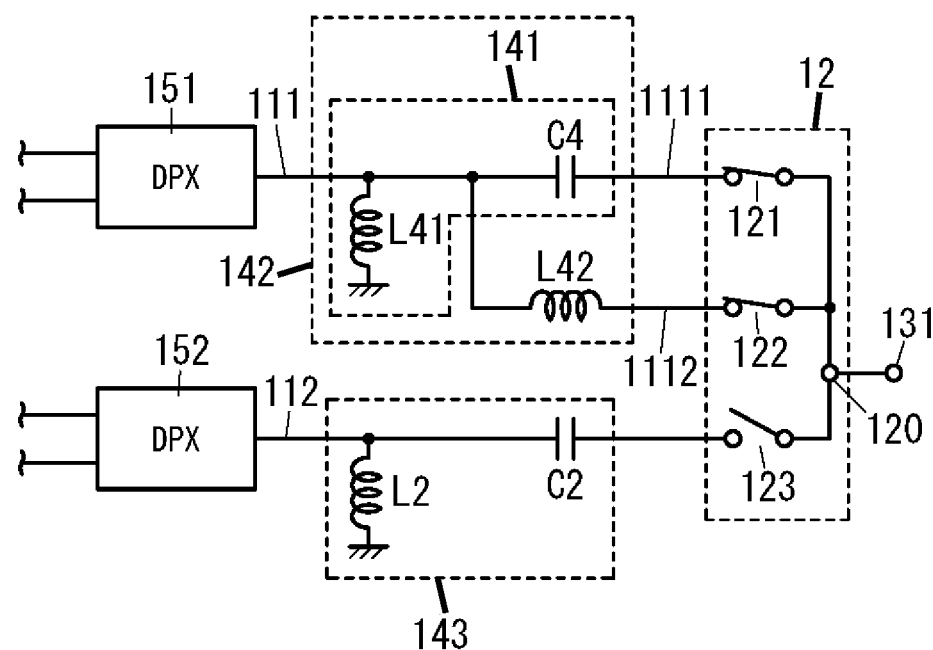
FIG. 8 is a simplified circuit diagram illustrating a third example of matching circuits of the radio-frequency module.

For example, in FIG. 8, the matching circuit 141 is constituted by an inductor L41 and a capacitor C4 and the matching circuit 142 is constituted by the inductor L41 and an inductor L42, and the capacitor C4. The inductor L41 is electrically coupled in a shunt manner across the transmission path 111 and ground. The capacitor C4 is electrically coupled in series with the first transmission path 1111. The inductor L42 is electrically coupled in series with the second transmission path 1112.

When ON control is performed for only the switch 121, electrical communication between only the matching circuit 141 and the antenna terminal 131 is established. The configuration of the matching circuit 141 is structured in the high-pass type.

When ON control is performed for both the switches 121 and 122, the matching circuits 141 and 142 establish electrical communication with the antenna terminal 131. In this case, the matching circuit 142 functions similarly to a notch filter due to the resonant action of the capacitor C4 and the inductor L42.

Figure 9:
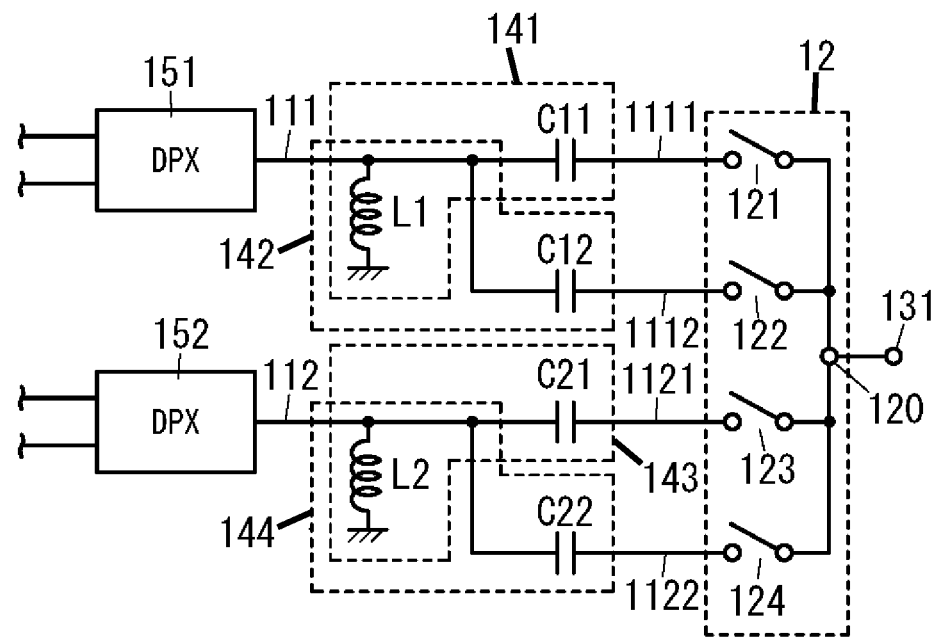
FIG. 9 is a circuit diagram illustrating part of a configuration of a first modified example of the radio-frequency module.

Next, a first modified example of the radio-frequency module 1 is illustrated in FIG. 9.

The radio-frequency module 1 of the first modified example includes two transmission paths 1121 and 1122 into which the transmission path 112 branches. In the first modified example, the transmission path 1121 is referred to as a third transmission path 1121 and the transmission path 1122 is referred to as a fourth transmission path 1122. The third transmission path 1121 and the fourth transmission path 1122 both respond to the second communication band.

In addition, the first switching circuit 12 also includes a switch 124. Furthermore, the radio-frequency module 1 also includes a matching circuit 144 with respect to which electrical communication with the antenna terminal 131 is established via the switch 124.

The matching circuit 143 in FIG. 9 is provided in relation to the third transmission path 1121 and constituted by the inductor L2 and a capacitor C21. The inductor L2 is electrically coupled in a shunt manner across the transmission path 112 and ground. The capacitor C21 is electrically coupled in series with the third transmission path 1121. The matching circuit 144 is provided in relation to the fourth transmission path 1122 and constituted by the inductor L2 and a capacitor C22. The capacitor C22 is electrically coupled in series with the fourth transmission path 1122.

Electrical communication between the third transmission path 1121 and the antenna terminal 131 is established via the switch 123 in an ON state. Electrical communication between the fourth transmission path 1122 and the antenna terminal 131 is established via the switch 124 in an ON state.

In the radio-frequency module 1, by performing ON or OFF control individually for the switches 121 and 122 of the first switching circuit 12, impedance matching with respect to the transmission path 111 side is achieved by using the matching circuit 141 or 142. Similarly, in the radio-frequency module 1, by performing ON or OFF control individually for the switches 123 and 124 of the first switching circuit 12, impedance matching with respect to the transmission path 112 side is achieved by using the matching circuit 143 or 144.

In FIG. 9, the radio-frequency module 1 includes four transmission paths (the first transmission path 1111, the second transmission path 1112, the third transmission path 1121, and the fourth transmission path 1122) and a matching circuit is provided for each of the four transmission paths. As a result, the radio-frequency module 1 can have a wider adjustment range for impedance matching and thus be applied to various communication bands and various types of the antenna 2.

For example, at the time of communications in the first single mode, the first control unit 191 performs ON control for the switch 121 and OFF control for the switches 122 to 124. As a result, the electrical connection between the first transmission path 1111 and the antenna terminal 131 is in a connected state while the electrical connection between the second transmission path 1112 and the antenna terminal 131, the electrical connection between the third transmission path 1121 and the antenna terminal 131, and the electrical connection between the fourth transmission path 1122 and the antenna terminal 131 are in a disconnected state.

Similarly, at the time of communications in the second single mode, the first control unit 191 performs ON control for the switch 124 and OFF control for the switches 121 to 123. As a result, the electrical connection between the fourth transmission path 1122 and the antenna terminal 131 is in a connected state while the electrical connection between the first transmission path 1111 and the antenna terminal 131, the electrical connection between the second transmission path 1112 and the antenna terminal 131, and the electrical connection between the third transmission path 1121 and the antenna terminal 131 are in a disconnected state.

Similarly, at the time of communications in the CA mode, the first control unit 191 performs ON control for the switches 122 and 123 and OFF control for the switches 121 and 124. As a result, the electrical connection between the second transmission path 1112 and the antenna terminal 131 and the electrical connection between the third transmission path 1121 and the antenna terminal 131 are in a connected state while the electrical connection between the first transmission path 1111 and the antenna terminal 131 and the electrical connection between the fourth transmission path 1122 and the antenna terminal 131 are in a disconnected state.

Figure 10:
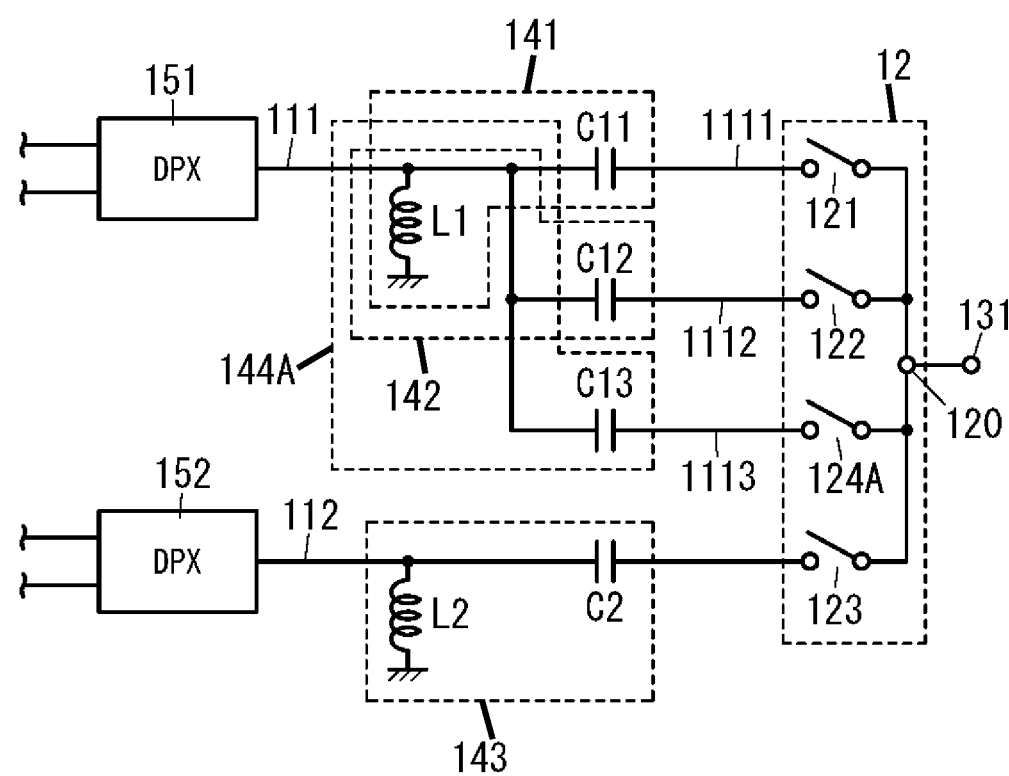
FIG. 10 is a circuit diagram illustrating part of a configuration of a second modified example of the radio-frequency module.

Next, a second modified example of the radio-frequency module 1 is illustrated in FIG. 10.

The radio-frequency module 1 of the second modified example also includes a transmission path 1113 separated from the transmission path 111. In the second modified example, the transmission path 1113 is referred to as a fifth transmission path 1113.

In addition, the first switching circuit 12 also includes a switch 124A. Furthermore, the radio-frequency module 1 also includes a matching circuit 144A that is electrically coupled to the fifth transmission path 1113 via the switch 124A.

The matching circuit 144A in FIG. 10 is provided in relation to the fifth transmission path 1113 and constituted by the inductor L1 and a capacitor C13. The inductor L1 is electrically coupled in a shunt manner across the transmission path 111 and ground. The capacitor C13 is electrically coupled in series with the fifth transmission path 1113. Electrical communication between the fifth transmission path 1113 and the antenna terminal 131 is established via the switch 124A in an ON state.

In the radio-frequency module 1, by performing ON or OFF control individually for the switches 121, 122, and 124A of the first switching circuit 12, impedance matching with respect to the transmission path 111 side is achieved by using the matching circuit 141, 142, or 144A. Similarly, in the radio-frequency module 1, by performing ON or OFF control individually for the switch 123 of the first switching circuit 12, impedance matching with respect to the transmission path 112 side is achieved by using the matching circuit 143.

In FIG. 10, in the radio-frequency module 1, multiple (three in this example) matching circuits are provided for only one transmission path, that is, the transmission path 111. As a result, the radio-frequency module 1 can have a wider adjustment range for impedance matching and be applied to various combinations of communication bands including the first communication band, in the CA mode involving the first communication band.

Figure 11:
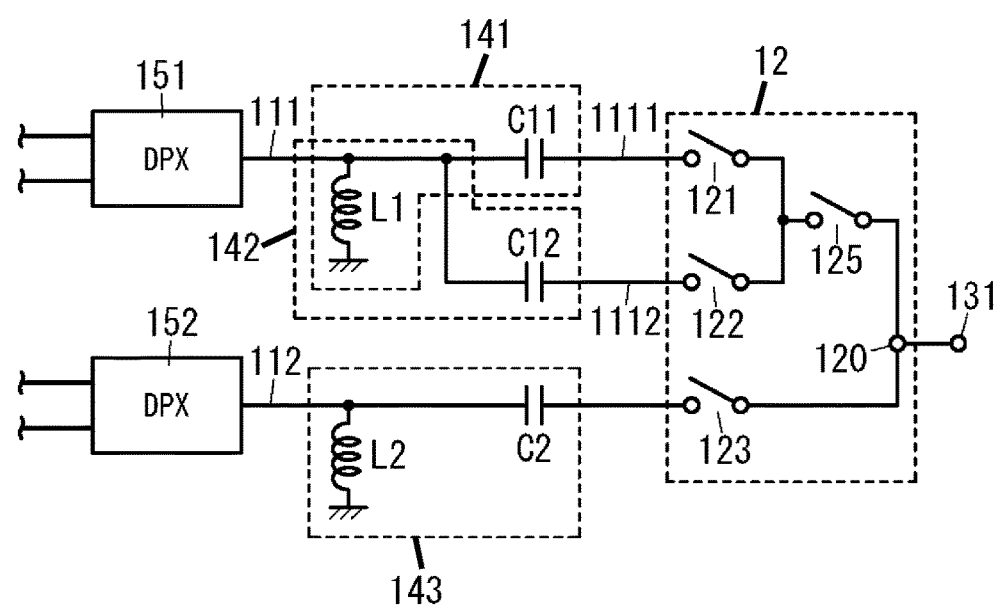
FIG. 11 is a circuit diagram illustrating part of a configuration of a third modified example of the radio-frequency module.

Next, a third modified example of the radio-frequency module 1 is illustrated in FIG. 11.

In the radio-frequency module 1 of the third modified example, the first switching circuit 12 also includes a switch 125. One end of the switch 125 is coupled to one end of the switch 121 and one end of the switch 122 while the other end of the switch 125 is coupled to the common terminal 120. That denotes that the switch 125 is positioned between the switches 121 and 122, and the common terminal 120. Electrical communication between the first transmission path 1111 and the antenna terminal 131 is established via the switches 121 and 125 both in an ON state. Electrical communication between the second transmission path 1112 and the antenna terminal 131 is established via the switches 122 and 125 both in an ON state.

For example, while the first control unit 191 performs ON control for both the switches 121 and 122, the first control unit 191 switches ON or OFF the switch 125. As a result, the first control unit 191 controls a connected state or a disconnected state collectively for the electrical connection between the first transmission path 1111 and the antenna terminal 131 and the electrical connection between the second transmission path 1112 and the antenna terminal 131.

Figure 12:
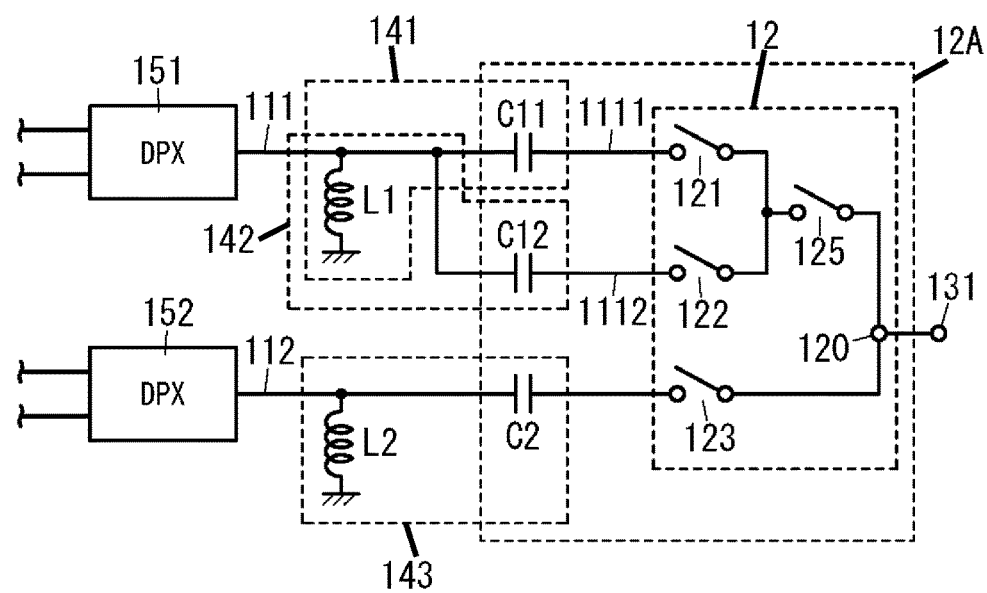
FIG. 12 is a circuit diagram illustrating part of another configuration of the third modified example of the radio-frequency module.

Moreover, as illustrated in FIG. 12, the first switching circuit 12 and the capacitors C11, C12, and C2 may be formed into a single chip, namely a semiconductor chip 12A. In this case, the semiconductor chip 12A involves the first switching circuit 12 and also partially involves the matching circuits 141, 142, and 143.

It should be noted that the number of switches included in the first switching circuit 12, ON or OFF control of the first switching circuit 12, the connection arrangement of impedance elements of the matching circuit, the frequency range of a communication band, the combination of communication bands in the CA mode are not limited to the configurations described above. The number of switches included in the first switching circuit 12, ON or OFF control of the first switching circuit 12, the connection arrangement of impedance elements of the matching circuit, the frequency range of a communication band, the combination of communication bands used in the CA mode are set as appropriate in accordance with, for example, the frequency range of a communication band that is employed and the combination of communication bands used in the CA mode.

For example, the radio-frequency module 1 may include three transmission paths that respond individually to a communication band of the 700 MHz band, a communication band of the 800 MHz band, and a communication band of the 900 MHz band. In this case, the radio-frequency module 1 can respond to three single mode and six CA modes of combinations of two communication bands at the maximum. The CA mode may correspond to a combination of three or more communication bands.

Further, in the radio-frequency module 1, the total number of usable communication bands (transmission paths) is two or more and the number of matching circuits is greater than the total number of usable communication bands.

Figure 13:
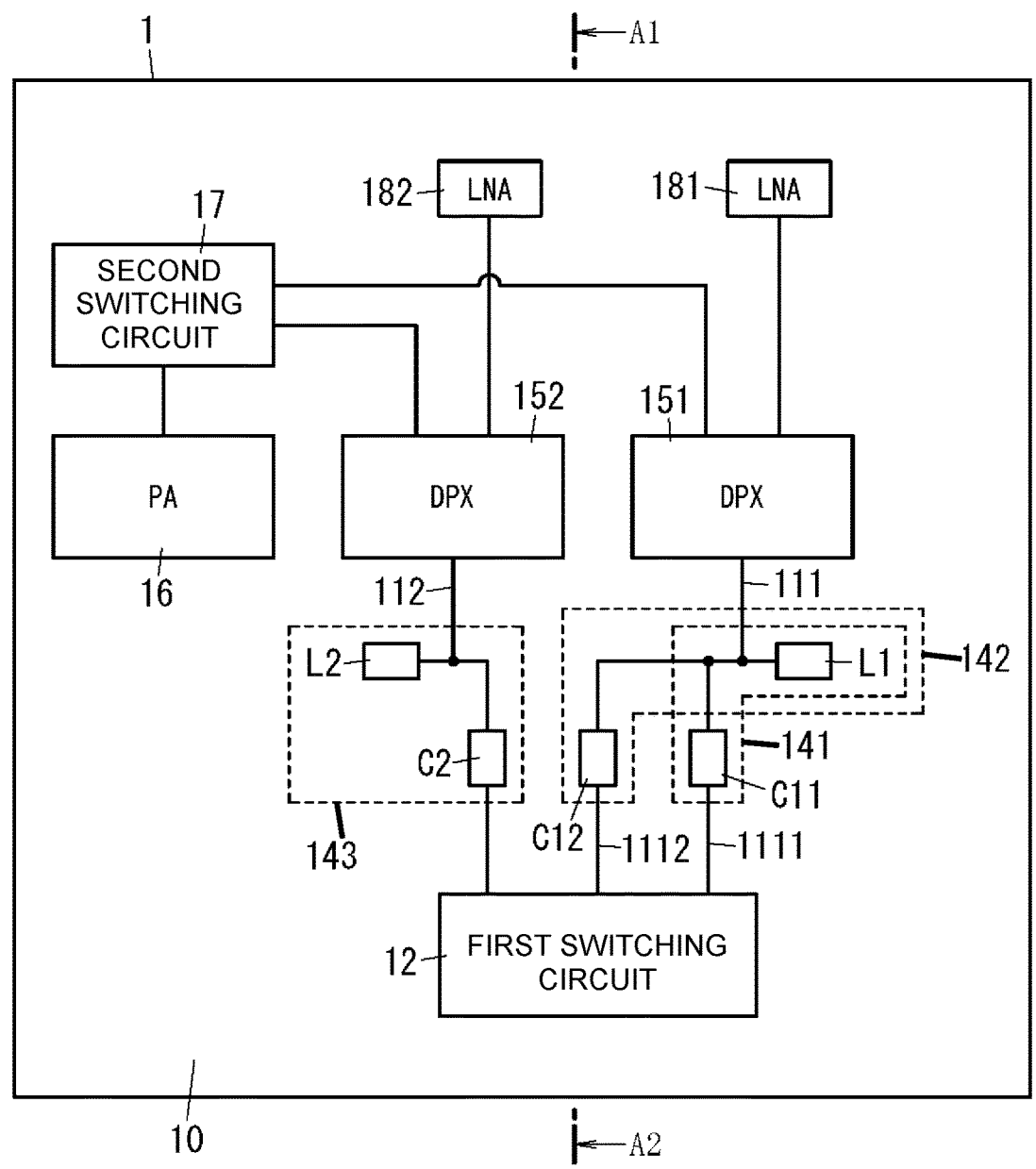
FIG. 13 is a plan diagram schematically illustrating a configuration of a component arrangement of the radio-frequency module.
Figure 14:
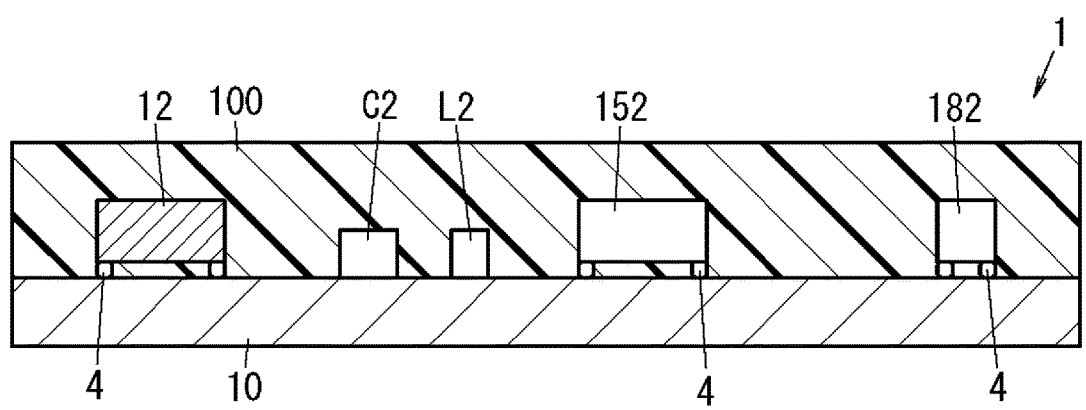
FIG. 14 is a sectional view taken along line A1-A2 of the radio-frequency module.

FIGS. 13 and 14 schematically illustrate a configuration of a component arrangement of the radio-frequency module 1. In the radio-frequency module 1, the transmission paths 111 and 112, the first switching circuit 12, the antenna terminal 131, the matching circuits 141 to 143, the duplexers 151 and 152, the power amplifier 16, the second switching circuit 17, the low noise amplifiers 181 and 182, and the switch control circuit 19, which are illustrated in FIG. 1, are disposed in or on a multilayer substrate 10.

A surface layer of the multilayer substrate 10 is sealed with resin 100 such as epoxy resin, which improves impermeability, moisture resistance, and vibration resistance and avoids dust adhering to the surface layer. The resin 100 is omitted in FIG. 13 for the purpose of description.

The multilayer substrate 10 can be a low temperature co-fired ceramics substrate in which silver or copper is used for a conductor. The transmission paths 111 and 112 are formed of silver or copper on the surface layer or in an internal layer of the multilayer substrate 10. The first switching circuit 12, the duplexers 151 and 152, the power amplifier 16, the second switching circuit 17, the low noise amplifiers 181 and 182, and the switch control circuit 19 are all IC (Integrated Circuit) chips composed of, for example, passive elements and semiconductor elements that are integrated, and are mounted on the surface layer of the multilayer substrate 10 by using solder 4. The mounting process on the multilayer substrate 10 is performed by using solder bumps. The impedance elements such as capacitors and inductors that constitute the matching circuits 141 to 143 are mounted on the surface layer of the multilayer substrate 10 as chip components. It should be noted that the impedance elements may be disposed in the internal layer of the multilayer substrate 10 or on the surface layer of the multilayer substrate 10.

In the radio-frequency module 1, when either transmission or reception operation is performed by using any particular communication band of multiple communication bands, a transmit-side or receive-side filter, instead of a duplexer, is electrically coupled to a communication path responding to the particular communication band. In this case, the transmit-side or receive-side filter corresponds to a filter circuit.

As described above, the radio-frequency module 1 of a first aspect according to the embodiment includes the first transmission path 1111 and the second transmission path 1112, the third transmission path 112 (or 1121), the antenna terminal 131, the matching circuits 141, 142, and 143, and the first switching circuit 12 (a switching circuit). The first transmission path 1111 and the second transmission path 1112 respond to the first communication band. The second transmission path 1112 respond to the second communication band of a frequency range different from another frequency range of the first communication band. The antenna terminal 131 is electrically coupled to the antenna 2.

The matching circuits 141, 142, and 143 are provided respectively for the first transmission path 1111, the second transmission path 1112, and the third transmission path 112 (or 1121). The first switching circuit 12 includes the common terminal 120 with respect to which electrical connection of one or more of the first transmission path 1111, the second transmission path 1112, and the third transmission path 112 is selectively established. The common terminal 120 is electrically coupled to the antenna terminal 131. When communications are performed by using only the first communication band, the first switching circuit 12 selects the first transmission path 1111. When communications are performed by using together the first communication band and the second communication band, the first switching circuit 12 selects the second transmission path 1112 and the third transmission path 112.

The radio-frequency module 1 described above achieves impedance matching by performing switching with respect to the transmission paths and the matching circuits in accordance with a communication band of the multiple communication bands (the first communication band and the second communication band) that is used for communications. Therefore, the radio-frequency module 1 can reduce communication signal loss in both the case of employing one communication band of multiple communication bands and the case of employing two or more communication bands together.

Additionally, the radio-frequency module 1 performs selection of transmission path in accordance with communication bands used for communications and selection of matching circuit in accordance with the number of communication bands used for communications and the combination of the communication bands by performing switching operation of the first switching circuit 12.

Specifically, in the radio-frequency module 1, the first switching circuit 12 has a function of performing selection of communication band and a function of performing selection of matching circuit for impedance matching. In other words, the configuration for performing selection of communication band and the configuration for impedance matching are implemented as a single switching circuit, that is, the first switching circuit 12. Therefore, the radio-frequency module 1 can achieve simplification of structure when compared to a structure in which the configuration for performing selection of communication band and the configuration for impedance matching are separately included.

As a result, the radio-frequency module 1 has an advantageous effect of reducing communication signal loss in both the case of employing one communication band of multiple communication bands and the case of employing two or more communication bands together. In addition, in the radio-frequency module 1, the configuration for performing selection of communication band and the configuration for impedance matching are implemented as a simple structure.

Furthermore, with respect to the first aspect, the radio-frequency module 1 of a second aspect according to the embodiment may also include the first filter circuit (the duplexer 151) and the second filter circuit (the duplexer 152). The first filter circuit is electrically coupled to the first transmission path 1111 and the second transmission path 1112. The second filter circuit is electrically coupled to the third transmission path 112.

Thus, the radio-frequency module 1 can reduce communication signal loss when the impedance of transmission path side varies due to the filter circuit (the duplexers 151 and 152).

Moreover, with respect to the first or second aspect, in the radio-frequency module 1 of a third aspect according to the embodiment, connection arrangements of the impedance elements constituting the respective matching circuits 141, 142, and 143 provided respectively for the first transmission path 1111, the second transmission path 1112, and the third transmission path 112 (or 1121) may be identical to each other.

Thus, the radio-frequency module 1 can achieve further simplification of structure by employing the identical configuration for the multiple matching circuits.

Further, with respect to any one of the first to third aspects, the radio-frequency module 1 of a fourth aspect according to the embodiment may also include the fourth transmission path 1122 that responds to the second communication band and the matching circuit 144 provided for the fourth transmission path 1122. The first switching circuit 12 selects the fourth transmission path 1122 when communications are performed by employing only the second communication band.

As a result, the radio-frequency module 1 can have a wider adjustment range for impedance matching and be applied to various communication bands and various types of the antenna 2.

Furthermore, with respect to any one of the first to fourth aspects, the radio-frequency module 1 of a fifth aspect according to the embodiment may also include the transmission amplifier circuit (the power amplifier 16). The transmission amplifier circuit amplifies transmit signals of the first communication band and the second communication band.

Thus, in the radio-frequency module 1, a front-end circuit for wireless communications that can operate in the CA mode can be configured.

Moreover, with respect to any one of the first to fifth aspects, the radio-frequency module 1 of a sixth aspect according to the embodiment may also include the reception amplifier circuit (the low noise amplifiers 181 and 182). The reception amplifier circuit amplifies receive signals of the first communication band and the second communication band.

Thus, in the radio-frequency module 1, a front-end circuit for wireless communications that can operate in the CA mode can be configured.

The embodiment and the modified examples described above are mere examples of the present disclosure. Therefore, the present disclosure is not limited to the embodiment and the modified examples described above and various changes other than the embodiment and the modified examples may be made depending on design or the like without necessarily departing from the technical idea of the present disclosure.

REFERENCE SIGNS LIST 1 radio-frequency module
1111 first transmission path
1112 second transmission path
112 third transmission path
1121 third transmission path
1122 fourth transmission path
12 first switching circuit (switching circuit)
131 antenna terminal
141, 142, 143, 144, 144A matching circuit
151 duplexer (first filter circuit)
152 duplexer (second filter circuit)
16 power amplifier (transmission amplifier circuit)
17 second switching circuit
181, 182 low noise amplifier (reception amplifier circuit)
19 switch control circuit
C2, C3, C4, C11, C12, C13, C21, C22 capacitor (impedance element)
L1, L2, L31, L32, L41, L42 inductor (impedance element)
2 antenna
3 communication control circuit

The invention claimed is:

1. A radio-frequency module comprising:
a first transmission path and a second transmission path each configured to transmit signals in a first communication band;
a third transmission path configured to transmit signals in a second communication band, the second communication band being different than the first communication band;
an antenna terminal electrically coupled to an antenna;
a first matching circuit in the first transmission path, a second matching circuit in the second transmission path, and a third matching circuit in the third transmission path; and
a switching circuit configured to selectively connect one or more of the first transmission path, the second transmission path, and the third transmission path to a common terminal, wherein:
the common terminal is electrically coupled to the antenna terminal,
the switching circuit is configured to connect the first transmission path to the common terminal when communications with the radio-frequency module only employ the first communication band, and
the switching circuit is configured to connect the second transmission path and the third transmission path to the common terminal when communications with the radio-frequency module employ both the first communication band and the second communication band.

2. The radio-frequency module according to claim 1, further comprising:
a first filter circuit electrically coupled to the first transmission path and the second transmission path; and
a second filter circuit electrically coupled to the third transmission path.

3. The radio-frequency module according to claim 1, wherein the first matching circuit, the second matching circuit, and the third matching circuit comprise a common configuration of impedance elements.

4. The radio-frequency module according to claim 1, further comprising:
a fourth transmission path configured to transmit signals in the second communication band; and
a fourth matching circuit in the fourth transmission path, wherein the switching circuit is configured to connect the fourth transmission path to the common terminal when communications with the radio-frequency module only employ the second communication band.

5. The radio-frequency module according to claim 1, further comprising a transmission amplifier circuit configured to amplify transmit signals in the first communication band or in the second communication band.

6. The radio-frequency module according to claim 1, further comprising a reception amplifier circuit configured to amplify receive signals in the first communication band or in the second communication band.

7. The radio-frequency module according to claim 1, wherein the first matching circuit, the second matching circuit, and the third matching circuit each comprise:
   a capacitor having a first end connected to the switching circuit, and
   an inductor having a first end connected to a second end of the capacitor and a second end connected to ground.

8. The radio-frequency module according to claim 7, wherein the first matching circuit and the second matching circuit share a common inductor.

9. The radio-frequency module according to claim 1, wherein the first matching circuit and the second matching circuit each comprise:
   an inductor having a first end connected to the switching circuit, and
   a capacitor having a first end connected to a second end of the inductor and a second end connected to ground; and
the third matching circuit comprises:
   a capacitor having a first end connected to the switching circuit, and
   an inductor having a first end connected to a second end of the capacitor and a second end connected to ground.

10. The radio-frequency module according to claim 9, wherein the first matching circuit and the second matching circuit share a common capacitor.

11. The radio-frequency module according to claim 1, wherein the first matching circuit and the third matching circuit each comprise:
   a capacitor having a first end connected to the switching circuit, and
   an inductor having a first end connected to a second end of the capacitor and a second end connected to ground; and
the second matching circuit comprises:
   an inductor having a first end connected to the switching circuit and a second end connected to ground.

12. The radio-frequency module according to claim 11, wherein the first matching circuit and the second matching circuit share a common inductor.

13. The radio-frequency module according to claim 1, wherein the first matching circuit and the third matching circuit each comprise:
   a capacitor having a first end connected to the switching circuit, and
   an inductor having a first end connected to a second end of the capacitor and a second end connected to ground; and
the second matching circuit comprises:
   a first inductor having a first end connected to the switching circuit, and
   a second inductor having a first end connected to a second end of the first inductor and a second end connected to ground.

14. The radio-frequency module according to claim 13, wherein the inductor of the first matching circuit and the second inductor of the second matching circuit are embodied as a single inductor.

* * * * *